United States Patent [11] 3,610,785

[72] Inventor Erich Hahn
 Ennepetal-Buttenberg, Germany
[21] Appl. No. 875,642
[22] Filed Nov. 12, 1969
[45] Patented Oct. 5, 1971
[73] Assignee Firma August Bilstein
 Ennepetal-Altenvoirde, Germany
[32] Priority Nov. 12, 1968
[33] Germany
[31] P 18 08 549.9

[54] PUMP STRUCTURE FOR SELF-ADJUSTING HYDROPNEUMATIC SUSPENSIONS
 7 Claims, 3 Drawing Figs.
[52] U.S. Cl. ................................................. 417/569
[51] Int. Cl. ............................................... F04b 21/02
[50] Field of Search.......................................... 417/569,
 570, 571, 568, 567, 559, 451, 452, 453, 454

[56] References Cited
 UNITED STATES PATENTS
 1,120,635 12/1914 Vidar .......................... 417/569
 1,489,452 4/1924 Napolis et al. ................. 417/569
 2,690,278 9/1954 Bacheller ..................... 417/567 X Primary Examiner—Robert M. Walker
Attorney—Karl F. Ross ABSTRACT: A miniature hydraulic pump, especially for automotive self-leveling vehicle suspensions using electric drive motors, in which the intake passage between the intake valve and the pumping chamber is split into two bores which communicate with the intake valve chamber on opposite sides of a ball check. The portion of the intake passage turned toward the pumping chamber is sectorally divergent away from the pumping chamber and lies in a plane perpendicular to the axis of the plunger and the pumping chamber.

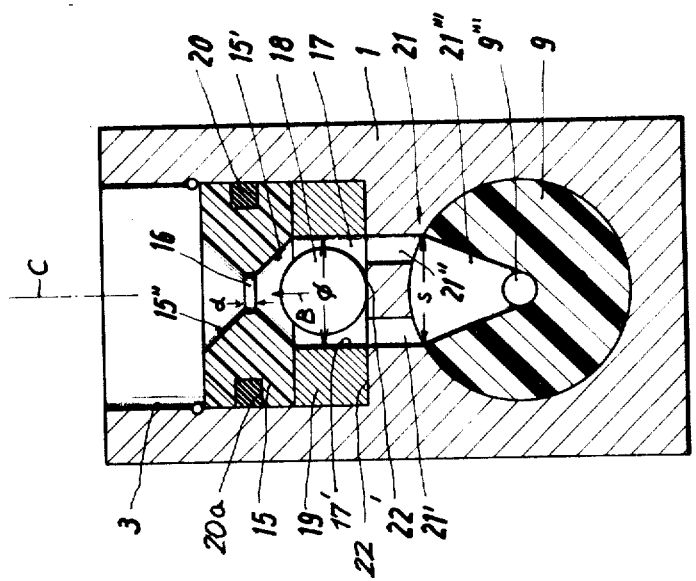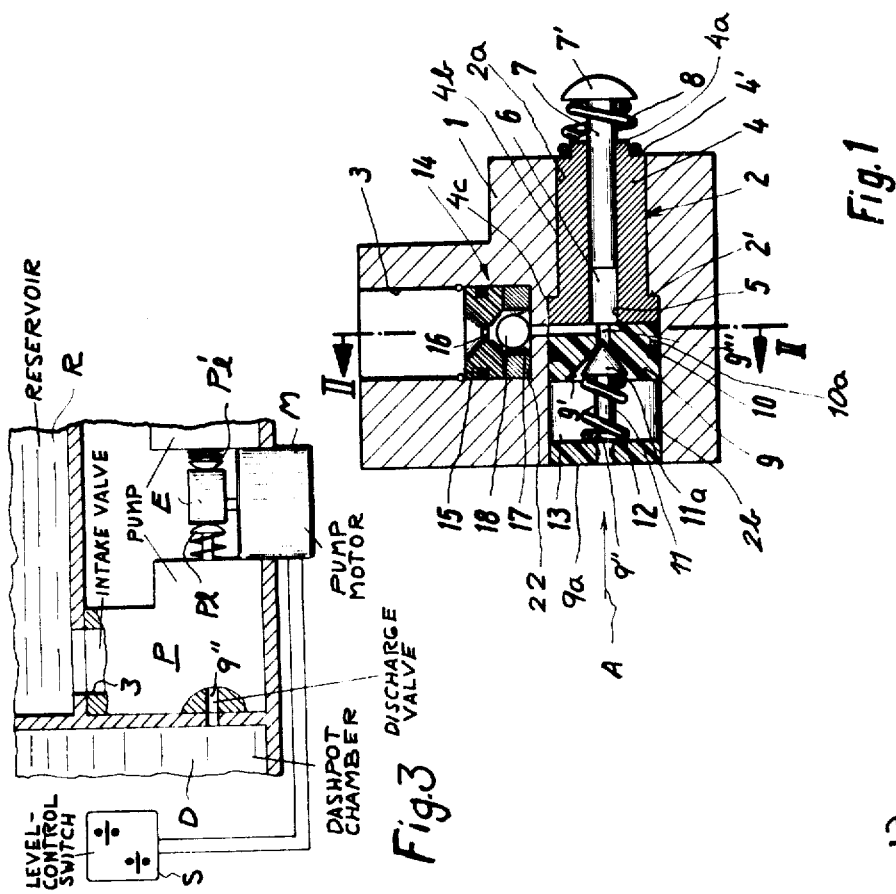
Erich Hahn
Inventor.
Karl F. Ross
Attorney

PUMP STRUCTURE FOR SELF-ADJUSTING HYDROPNEUMATIC SUSPENSIONS

My present invention relates to a hydraulic pump and, more particularly, to a hydraulic pump for level-regulating hydropneumatic suspensions.

It has become increasingly important in recent years to provide automatic level regulation of the body of an automotive vehicle with respect to the undercarriage thereof and, accordingly, numerous load-leveling or body-leveling devices have been provided for this purpose.

An automotive vehicle, e.g. a truck or automobile, generally comprises a chassis or body from which the wheel structures are resiliently suspended, shock-absorbing damper devices being provided in conjunction with springs between the wheel assemblies and the chassis or body. If the spring constant is unchanged with increasing load upon the body there occurs a downward displacement of the chassis or body relative to the wheel structure which may be disadvantageous. The damper and shock-absorbing devices, however, may include hydropneumatic chambers functioning in part as springs resisting the downward displacement of the chassis or body under load. There have been provided heretofore pumping arrangements adapted to increase the pressure in a hydropneumatic compartment in such systems to raise the body to a predetermined level in spite of loading.

In certain systems for this automatic level regulation of a vehicle body, a plunger connected to one of the dashpot members may be reciprocated in a cylinder connected with the other, in the course of the normal oscillations of the wheel assemblies and the body during vehicular motion. The pumping action may be controlled by a valve adapted to establish the proper level of the body. In still another arrangement for this purpose an electrically driven pump is set in operation to supply the fluid pressure necessary to restore the body level in the event of loading to reduce the level.

In my commonly assigned copending application Ser. No. 828,297, for example, I have described and claimed a self-leveling hydropneumatic suspension unit adapted to operate even when the vehicle is stationary.

The suspension-unit housing in this case includes an electric motor driving a pump as well as a regulating valve. A level control switch electrically operates the motor and the valve in dependence upon the vehicle load.

More specifically, the hydropneumatic suspension includes an elongated unit having a piston of the dashpot adapted to be connected to one of the vehicle members (e.g. the vehicle body) and a cylinder within which the dashpot piston is reciprocable and connected to the other vehicle member, e.g. a wheel assembly. Below this working chamber or cylinder, which is filled with a liquid, I provide an electrically driven pump adapted to displace liquid from a reservoir chamber into the working cylinder. A regulating valve is arranged to control the flow of fluid from the working cylinder to the reservoir chamber and an electric motor forms part of the suspension unit and is controlled by a level-sensing switch connected between the motor and an energy source such as the vehicle battery. The pump is formed in the base of the working cylinder and has a number of radial passageways in each of which a pumping plunger is displaceably mounted. Each of the plungers has a head at its radially inner end which is biased by a spring into contact with the end of a cam shaft whose cam surfaces are eccentric and are driven by the motor mounted beneath the base plug. The radially outer ends of the passageways form relatively small pump chambers which are connected with the working chamber of the dashpot by outlet channels fitted with nonreturn or check valves.

In automatic level-regulating devices for automotive vehicles in which an electric motor is provided to drive a pump, it is necessary to minimize the size of the pump assembly and, consequently, to operate with relatively short pumping strokes to allow the system to be assembled as part of the hydropneumatic suspension and keep the mass associated with the oscillating wheel assemblies as small as possible. Thus the volume of each stroke of a piston pump of this character is relatively small and, to obtain a significant displacement, the piston or plunger must be reciprocated at a high rate.

Because of the relatively small pumping chamber and volume per stroke, the ports, ducts or passages connecting the pumping chamber with the discharge valve and the intake valve must be proportionately short and of narrow cross section. The pump requirements are a result of the fact that the size must be kept small, that the pump must be capable of overcoming the pressure within the shock-damping cylinder, and that the pressure in the hydraulic supply chamber must be kept as low as possible.

As a result of the narrow dimensions of the pumping chamber and the passages leading to the valves, cavitation affects and/or foaming are encountered in the fluid which is displaced. The emulsification and foaming action is extremely disadvantageous in that gas bubbles are formed within the working chamber, thereby limiting the efficiency of the pump since the trapped gases may expand and contract with each pumping stroke without displacement of fluid, especially when the pump stroke is short and the plunger is oscillated at high rates. The capillary effects tend to retain the gas bubbles or accumulations in the slender channels and thereby also limit the intake of fluid into the pumping chamber.

In general, therefore, these disadvantages can be attributed to the relatively long but relatively narrow channels between the intake and outlet valves and the pumping chamber, and especially in the intake passage running from the intake valve to the pumping chamber. It is not, however, a simple matter to enlarge the intake passage since such enlargement increases the displacement requirements prior to valve closure and has hitherto required greater pump strokes or pump-chamber volumes.

It is, therefore, the principal object of the present invention to provide an improved hydraulic pump of the plunger type in which the aforementioned disadvantages are obviated and the effect of foaming/emulsification and entrapment of gases is markedly reduced or eliminated.

It is another object of this invention to provide a pump arrangement in combination with a self-adjusting hydropneumatic suspension which is of increased efficiency by comparison with earlier pump arrangements and yet need not be of increased dimensions.

Still further, it is an object of this invention to provide an improved hydraulic pump for a self-adjusting hydropneumatic suspension for automotive vehicles which extends the principles set forth in the copending application mentioned earlier.

These objects and others which will become apparent hereinafter are attained in accordance with the present invention in a hydraulic pump for the purposes described which, in spite of its small dimensions and the concomitantly narrow pumping chamber, it more effective than the earlier systems by providing an automatic venting of the pump chamber, thereby releasing any gas accumulations which may be present therein.

More specifically, the hydraulic pump of the present invention is provided with a relatively small cross section pumping chamber in which a plunger is reciprocable, but which has an intake passage whose side turned toward the intake-valve chamber is of lesser cross section than the side turned toward the pumping chamber, the passage opening into the intake port on opposite sides of the intake-valve body. Advantageously, the intake passage has a portion turned toward the pump chamber which widens in sector configuration toward the valve chamber and is split into two bores opening on opposite sides of the intake valve body as noted earlier. The intake valve, according to this invention, is a ball check valve adapted to seat against a frustoconical surface surrounding the intake port which may have a cross section substantially less than the collective cross sections of the two bores or substantially equal to the cross section of the pumping chamber.

Between the two bores and in axial alignment with the intake port, so as to provide an abutment surface for the ball check, I provide a member or wall which subdivides the intake passage between the check valve chamber and the pumping chamber, the check valve chamber having a cross section greater than the collective cross sections of the two bores and narrowing via the frustoconical seat to the intake port.

The aforedescribed structure has been found, in practice, to eliminate the disadvantages of earlier hydraulic pump systems. Thus, when the pump plunger is oscillated back and forth at a high rate, there is established a circulation of hydraulic fluid into the intake port around the ball check and toward the upper part of the valve chamber. Any foam or emulsified hydraulic fluid appears to rise to the top of the sectoral chamber and, by virtue of its outwardly divergent configuration passes upwardly to the upper bore of the twin bores opening into the valve chamber. Surprisingly, in spite of the fact that hydraulic fluid is drawn into the intake port, accumulated gases pass over the ball check and through the intake port in the opposite direction, thereby completing the circulation path. Whereas earlier pumping arrangements resulted in entrapment of gas bubbles in the intake passage soon after commencement of operation, so that subsequent plunger strokes merely resulted in compression and expansion of the entrapped gases, the system of the present invention appears to give rise to a circulation of gases out of the pumping chamber and the valve chamber. By virtue of the relationship of the two bores to the sectoral shape of their manifold and to the ball check of the intake valve, pumping proceeds without entrapment of gas bubbles and reduction in pumping deficiency and, in spite of the fact that gas is vented from the valve chamber, hydraulic fluid appears to enter without noticeable impediment. While the intake valve port is relatively narrow as indicated earlier, a forward movement of hydraulic fluid and an opposite movement of entrained gases are found to take place in the respective bores so that pumping remains unobstructed. As the gases are passed into the valve chamber, they vent into a low-pressure reservoir from which the hydraulic fluid is drawn.

According to still another feature of this invention, the intake-valve seat is provided along its side turned away from the valve chamber and in the direction of the low-pressure reservoir with a frustoconically divergent recess aligned with the frustoconical seat and of a corresponding apex angle, the frustoconical recess being coaxial with the frustoconical seat and the circular intake port between them. It appears that the approved results obtained with this modification are in part derived from the fact that the length of the channel between the intake chamber and the low-pressure hydraulic fluid reservoir is reduced to a minimum so that no air entrapment can occur in this chamber. Furthermore, the frustoconical shape of the recess insures movement of any vented air away from the intake flow path.

The above and other objects, features and advantages of this invention will become more readily apparent from the following description, reference being made to the accompanying drawing in which:

FIG. 1 is an axial cross-sectional view through a hydraulic pump embodying the principles of this invention;

FIG. 2 is a cross section taken along the line II—II of FIG. 1, but drawn to a greater scale; and FIG. 3 is a view partially in elevation and with parts broken away indicating the relationship of the hydraulic pump of this invention to a system for the automatic control of the level of a vehicle body in response to loading.

In my copending application mentioned earlier, there are described numerous arrangements in which an electric motor M is provided with an eccentric shaft arrangement E designed to reciprocate the plungers P1 and P1' of a pair of one or more pumps P of the type shown in FIGS. 1 and 2. The motor M is controlled by a level-control switch S which may also operate a valve system capable of bleeding the hydraulically pressurizable damper D into which the hydraulic fluids is fed under pressure. The discharge port 9" of the pump P is here shown to communicate with the load leveler chamber D while the bore 3 of the pump P registers with a suitable port opening into the low-pressure reservoir R. When the switch means S operates the control valve to bleed the load leveler D, hydraulic fluid returns to the reservoir R. From FIG. 3 it will be apparent that the pump assembly P is extremely small and may be of half of the size represented in FIG. 1.

The miniature hydraulic pump shown in FIGS. 1 and 2 comprises a massive pump housing 1 formed with a longitudinally expanding bore 2 having a small-diameter portion 2a separated by a step 2' from a large diameter portion 2b and extending at right angles to a bore 3 terminating in an end wall 22 which separates the large diameter portion 2b from the bore 3.

The pump cylinder 4 is received within the bore 2 and is constituted as a cylindrical member having three steps, including a small diameter axially extending cylindrical boss 4a at one end projecting from the housing 1 and forming a centering member for a helicoidal compression spring 8 surrounding a pumping plunger 7 and seated against the head 7' thereof.

Inwardly of the cylindrical boss 4a, the cylinder 4 is provided with a cylindrical shank 4b of intermediate diameter, closely fitting in step 2a of the bore 2. The large diameter step 4c of the cylinder bears against the shoulder 2' and prevents further movement of the cylinder 4 to the right once the cylinder is inserted in the direction of arrow A into the bore 2.

Within the cylinder 4, there is provided the cylindrical longitudinal bore 5 which extends through the cylinder and slidably receives the plunger 7 so as to define therewith a generally cylindrical pumping chamber 6. At its free end, the plunger 7 has a convex head 7' conforming generally to a spheroidal surface and engageable with an eccentric or cam of an electric motor for reciprocation of the plunger as described in connection with FIG. 3. The spring 8 urges the plunger 7 to the right and is compressed by the eccentric.

An insert disk 9, preferably composed of a wear-resistant synthetic resin, such as polytetrafluoroethylene, is received in the large step 2b of the bore 2 and forms a cage for the discharge valve. An annular seal 10 is received in a peripheral groove 10a of the cage 9 and sealingly engages the wall of the bore 2 to prevent leakage of fluid between the pump chamber and the discharge chamber 13. The body 9 is formed with a discharge port 9''' communicating between the chamber 13 and the pumping chamber 6 and terminating in a frustoconical valve seat 9'. The latter cooperates with the conical tip 11a of a valve member 11 axially aligned with the plunger 7 and urged into the seat 9' by a compression spring 12 seated against the rear wall 9a of the insert 9. This rear wall is provided with a discharge opening 9" through which hydraulic fluid may be forced into the hydropneumatic pressure chamber of the load-leveling cylinder.

In the intake bore 3, which communicates with the reservoir of the self-leveling suspension, I provide the intake valve 14 which comprises, as best seen in FIG. 2, a valve seat 15 in the form of a disk which may be composed of a wear-resistant synthetic resin, such as polytetrafluoroethylene. In an annular groove 20a along the external periphery of this body 15, there is provided an elastomeric sealing ring 20 preventing communication between the intake valve chamber 17 and the channel 3 connecting this chamber with the reservoir.

The disk 15 is centrally provided with a valve bore 16, also referred to herein as the intake port, the valve bore having a length $d$ in the direction of fluid flow which is made small by comparison with the axial thickness of the disk 15. To this end, the side of the disk 15 turned away from the intake valve chamber is formed with a frustoconical recess 15" coaxial with the bore 16 and terminating therein, the recess widening outwardly from this bore. The valve seat 15', also coaxial with the bore 16 and the recess 15", may be of similar conicity and is turned toward the valve chamber 17. The valve chamber 17 is defined by a ring 19 inserted between the wall 22 and the disk 15 and provided with a central opening 17' of a diameter equal to the maximum diameter of the frustoconical valve seat 15'. This diameter is less than that of a ball check 18 received in the bore and limited in its axial movement away from the valve seat 15' by the wall 22 which is formed with a central portion 22' adapted to constitute an abutment for the ball 18. The ball and the abutment 22, 22' lie in a plane perpendicular to the axis of the bore 16 and the seat 15'. When the pump pressure builds up behind the ball 18, the latter is urged in the direction of arrow B into engagement with the seat 15' to block outflow of the hydraulic fluid into the reservoir from the pumping chamber 6. The bore 16 has a cross section not substantially greater than the cross section of the valve chamber 6 and possibly, as shown in FIG. 1, smaller than the cross section of the pump chamber.

Between the valve chamber 17 of the pump chamber 6, I provide an intake passage which is generally indicated by the reference numeral 21. The intake passage comprises, at its end proximal to the valve chamber 6, a sectoral portion 21''' converging radially inwardly to the discharge port 9''' but with a spread corresponding to the diameter of the discharge port 9''' as will be apparent from FIG. 1. The sectoral portion 21''' may be formed in the end of the insert body 9 abutting the pumping cylinder 4.

At its end communicating with the valve chamber 17, the intake passage 21 is split between a pair of axially extending bores 21' and 21'' which flank the axis C of the intake chamber and open into the latter on opposite sides of the ball 18 and the abutment surface 22' thereof. The bores 21' and 21'' are spaced apart to correspond to the maximum spread $s$ of the sectoral portion 21''' and the maximum diameter $\Phi$ of the bore 17'.

Upon reciprocation of the piston or plunger 7 by the eccentric and the electric motor described above, the motor being driven from the vehicle battery under the control of a level-sensing switch, fluid is alternately drawn through the port 16 and expelled at an elevated pressure through the port 9'''. During this process, forming of the hydraulic fluid may occur but it is found that a circulation is established around the ball whereby the gases may pass from the pumping chamber upwardly through the sectoral portion 21''' and eventually are vented through the port 16, as previously described.

The improvement described and illustrated is believed to admit of many modifications within the ability of persons skilled in the art, all such modifications being considered within the spirit and scope of the invention except as limited by the appended claims.

I claim:

1. A hydraulic pump comprising a housing forming a pump cylinder, a plunger reciprocable in said cylinder and defining a pump chamber therein, an intake valve communicating with a source of hydraulic fluid and connected with said chamber for delivering hydraulic fluid to said chamber, an outlet valve connected with said chamber for discharging hydraulic fluid under pressure therefrom and an intake passage formed in said housing and connecting said intake valve with said valve chamber, said passage having a larger cross section in the direction of said intake valve and a smaller cross section in the direction of said pump chamber, said intake valve including an intake port and a valve body adapted to block said port, said intake passage being bifurcated and opening in the direction of said intake port toward opposite sides of said body, said intake passage having a generally sectoral portion widening away from said pump chamber and lying in a plane perpendicular to the axis of said cylinder and said plunger, and a bifurcated portion communicating with said sectoral portion and constituted by a pair of mutually parallel bores formed in said housing, said intake valve defining in said housing an intake chamber communicating with said port and receiving said body, said body being formed as a ball received in said intake chamber, said bores opening into said intake chamber to either side of said ball.

2. The hydraulic pump as defined in claim 1 2h343 in said intake valve includes a valve member provided with said intake port and partially forming said intake chamber, said member being formed along its side turned toward said intake chamber with a frustoconical valve seat engageable with said ball and converting toward said port, and being formed along its side turned away from said intake chamber with a frustoconical recess widening outwardly from said port and coaxial therewith.

3. The hydraulic pump defined in claim 2 wherein said housing is provided with a stepped bore, said cylinder being received in said stepped bore, said outlet valve comprising an insert received in said stepped bore and abutting said cylinder while defining therewith said sectoral portion of said intake passage.

4. The hydraulic pump defined in claim 3 wherein said insert is composed of a wear-resistant synthetic resin and is formed in a side opposite said pump chamber with a frustoconical valve seat, said outlet valve including a conically pointed valve member received in said insert and spring-biased into the seat formed in said insert.

5. The hydraulic pump defined in claim 4 wherein said plunger has a free end projecting from said housing, said pump further comprising spring means seated against said housing and bearing against said free end and for yieldably urging same away from said housing.

6. The hydraulic pump defined in claim 5 wherein said free end has a rounded head forming a seat for said spring means and engageable with an eccentric assembly for reciprocating said plunger.

7. The hydraulic pump defined in claim 6, further comprising an electric motor for driving said eccentric assembly and reciprocating said plunger.